(12) United States Patent
Lin et al.

(10) Patent No.: US 11,818,732 B2
(45) Date of Patent: *Nov. 14, 2023

(54) METHOD AND BASE STATION FOR CONSTRUCTION OF DOWNLINK CONTROL INFORMATION FORMAT

(71) Applicant: FG Innovation Company Limited, Tuen Mun (HK)

(72) Inventors: Wan-Chen Lin, Taipei (TW); Yu-Hsin Cheng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,128

(22) Filed: Nov. 10, 2022

(65) Prior Publication Data

US 2023/0075089 A1 Mar. 9, 2023

Related U.S. Application Data

(63) Continuation of application No. 17/093,030, filed on Nov. 9, 2020, now Pat. No. 11,589,342.

(Continued)

(51) Int. Cl.
*H04W 4/00* (2018.01)
*H04W 72/23* (2023.01)
(Continued)

(52) U.S. Cl.
CPC ........... *H04W 72/23* (2023.01); *H04L 1/1812* (2013.01); *H04B 7/0456* (2013.01); *H04B 7/0478* (2013.01); *H04B 7/0639* (2013.01)

(58) Field of Classification Search
None
See application file for complete search history.

(56) References Cited

U.S. PATENT DOCUMENTS

| 11,271,625 B2 | 3/2022 | Park et al. |
| 2013/0121278 A1 | 5/2013 | Noh et al. |

(Continued)

FOREIGN PATENT DOCUMENTS

| EP | 2938013 A1 | 10/2015 |
| EP | 3364582 A1 | 8/2018 |

OTHER PUBLICATIONS

3GPP TS 38.213 V15.7.0 (Sep. 2019), 3rd Generation Partnership Project; Technical Specification Group Radio Access Network; NR; Physical layer procedures for control (Release 15) Tables 9.1.3-1 and 9.1.3-2, Sections 8.3, 9.1.2, 9.1.2.2, 9.1.3, 9.1.3.1, 9.1.3.2, and 9.2.5.2.

(Continued)

*Primary Examiner* — Bob A Phunkulh
(74) *Attorney, Agent, or Firm* — ScienBiziP, P.C.

(57) ABSTRACT

A method and a BS for construction of a DCI format are provided. The method includes configuring a first DAI field of first DCI with a first size and configuring a second DAI field of second DCI with a second size; generating at least one bit with a zero value for one of the first DAI field and the second DAI field if a size difference between the first size and the second size exists; and transmitting, to a UE, an RRC message, the first DCI, and the second DCI, wherein the RRC message includes information for configuring a HARQ-ACK codebook list, the HARQ-ACK codebook list includes a first HARQ-ACK codebook indicated by the first DCI and a second HARQ-ACK codebook indicated by the second DCI, and the first DCI and the second DCI have a same format.

8 Claims, 2 Drawing Sheets

Related U.S. Application Data

(60) Provisional application No. 62/932,206, filed on Nov. 7, 2019.

(51) Int. Cl.
  *H04L 1/1812* (2023.01)
  *H04B 7/0456* (2017.01)
  *H04B 7/06* (2006.01)

(56) References Cited

U.S. PATENT DOCUMENTS

| | | | |
|---|---|---|---|
| 2014/0153449 A1 | 6/2014 | Seo et al. | |
| 2015/0319777 A1 | 11/2015 | Seo et al. | |
| 2016/0344515 A1 | 11/2016 | Aiba et al. | |
| 2017/0273056 A1* | 9/2017 | Papasakellariou | H04W 52/281 |
| 2019/0174510 A1* | 6/2019 | Shin | H04W 72/00 |
| 2019/0191424 A1* | 6/2019 | Wang | H04L 5/0046 |
| 2019/0313401 A1* | 10/2019 | Wang | H04W 48/12 |
| 2019/0342040 A1* | 11/2019 | Tiirola | H04L 5/0055 |
| 2019/0373588 A1* | 12/2019 | Bae | H04L 5/0091 |
| 2020/0100248 A1* | 3/2020 | Kim | H04L 5/0094 |
| 2020/0107353 A1 | 4/2020 | Jung et al. | |
| 2020/0145138 A1* | 5/2020 | Bhattad | H04L 1/1614 |
| 2020/0187170 A1* | 6/2020 | Shin | H04J 11/00 |
| 2020/0344010 A1* | 10/2020 | Lei | H04W 72/0446 |
| 2020/0374045 A1 | 11/2020 | Yin et al. | |
| 2020/0403751 A1* | 12/2020 | Baldemair | H04L 1/0026 |
| 2021/0184801 A1 | 6/2021 | El Hamss et al. | |
| 2021/0226740 A1* | 7/2021 | Lei | H04L 1/1864 |
| 2021/0242955 A1* | 8/2021 | Suzuki | H04L 27/2613 |
| 2021/0243767 A1* | 8/2021 | Suzuki | H04L 5/0007 |
| 2021/0281458 A1 | 9/2021 | Takeda et al. | |
| 2021/0297190 A1 | 9/2021 | Baldemair et al. | |
| 2021/0345305 A1* | 11/2021 | Takeda | H04W 72/23 |
| 2021/0391955 A1 | 12/2021 | He et al. | |
| 2022/0052790 A1 | 2/2022 | Lei et al. | |

OTHER PUBLICATIONS

Non-Final Rejection dated Mar. 16, 2022 for U.S. Appl. No. 17/093,030 which is the parent application of the instant application.

Notice of Allowance dated Aug. 10, 2022 for U.S. Appl. No. 17/093,030 which is the parent application of the instant application.

Qualcomm Incorporated: "Multiplexing of PUCCH and PUSCH", 3GPP Draft; R1-1721387, 3RD Generation Partnership Project (3GPP), Mobile Competence Centre; 650, Route Des Lucioles; F-06921 Sophia-Antipolis Cedex; France Nov. 27, 2017 (Nov 27, 2017), pp. 1-11, XP051363831, Paragraph [0002]-Paragraph [0004].

Nokia et al.: "Remaining aspects of NR CA", 3GPP Draft; R1-1802540_CA, 3RD Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 16, 2018 (Feb. 16, 2018), XP051397476, Paragraph [0002]-Paragraph [0003].

* cited by examiner

METHOD AND BASE STATION FOR CONSTRUCTION OF DOWNLINK CONTROL INFORMATION FORMAT

CROSS-REFERENCE TO RELATED APPLICATION(S)

This application is a continuation application of U.S. patent application Ser. No. 17/093,030, filed on Nov. 9, 2020, which claims the benefit of and priority to U.S. Provisional Patent Application Ser. No. 62/932,206, filed on Nov. 7, 2019, entitled "Handling of DCI size budget per serving cell". The contents of all above-named applications are hereby fully incorporated herein by reference for all purposes.

FIELD

The present disclosure generally relates to wireless communications and, more particularly, to methods and apparatuses for construction of a downlink control information (DCI) format.

BACKGROUND

With the tremendous growth in the number of connected devices and the rapid increase in user/Network (NW) traffic volume, various efforts have been made to improve different aspects of wireless communication for the next-generation wireless communication system, such as fifth-generation (5G) New Radio (NR), by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, as the demand for radio access continues to increase, there is a need in the art to uniform different DCI formats.

SUMMARY

The present disclosure is directed to methods and apparatuses for construction of the DCI format.

According to a first aspect of the present disclosure, a method performed by a Base Station (BS) is provided for construction of a downlink control information (DCI) format. The method includes configuring a first downlink assignment index (DAI) field of first DCI with a first size and configuring a second DAI field of second DCI with a second size; generating at least one bit with a zero value for one of the first DAI field and the second DAI field if a size difference between the first size and the second size exists; and transmitting, to a User Equipment (UE), a radio resource control (RRC) message, the first DCI, and the second DCI, wherein the RRC message includes information for configuring a Hybrid Automatic Repeat reQuest-ACKnowledge (HARQ-ACK) codebook list, the HARQ-ACK codebook list includes a first HARQ-ACK codebook indicated by the first DCI and a second HARQ-ACK codebook indicated by the second DCI, and the first DCI and the second DCI have a same format.

In an implementation of the first aspect, the generated at least one bit with the zero value forms a most significant bit for the one of the first DAI field and the second DAI field.

In another implementation of the first aspect, a first priority of the first HARQ-ACK codebook and a second priority of the second HARQ-ACK codebook are different.

In another implementation of the first aspect, the first HARQ-ACK codebook and the second HARQ-ACK codebook have different types, and the types refer to a semi-static type and a dynamic type.

According to a second aspect of the present disclosure, a Base Station (BS) in a wireless communication system for construction of a downlink control information (DCI) format is provided. The wireless communication system includes a User Equipment (UE). The BS includes at least one processor; and at least one memory coupled to the at least one processor. The at least one memory stores computer-executable instructions that, when executed by the at least one processor, cause the BS to configure a first downlink assignment index (DAI) field of first DCI with a first size and configure a second DAI field of second DCI with a second size; generate at least one bit with a zero value for one of the first DAI field and the second DAI field if a size difference between the first size and the second size exists; and transmit, to the UE, a radio resource control (RRC) message, the first DCI, and the second DCI, wherein the RRC message includes information for configuring a Hybrid Automatic Repeat reQuest-ACKnowledge (HARQ-ACK) codebook list, the HARQ-ACK codebook list includes a first HARQ-ACK codebook indicated by the first DCI and a second HARQ-ACK codebook indicated by the second DCI, and the first DCI and the second DCI have a same format.

BRIEF DESCRIPTION OF THE DRAWINGS

Aspects of the present disclosure are best understood from the following when read with the accompanying figures. Various features are not drawn to scale. Dimensions of various features may be arbitrarily increased or reduced for clarity of discussion.

DESCRIPTION

Figure 1:
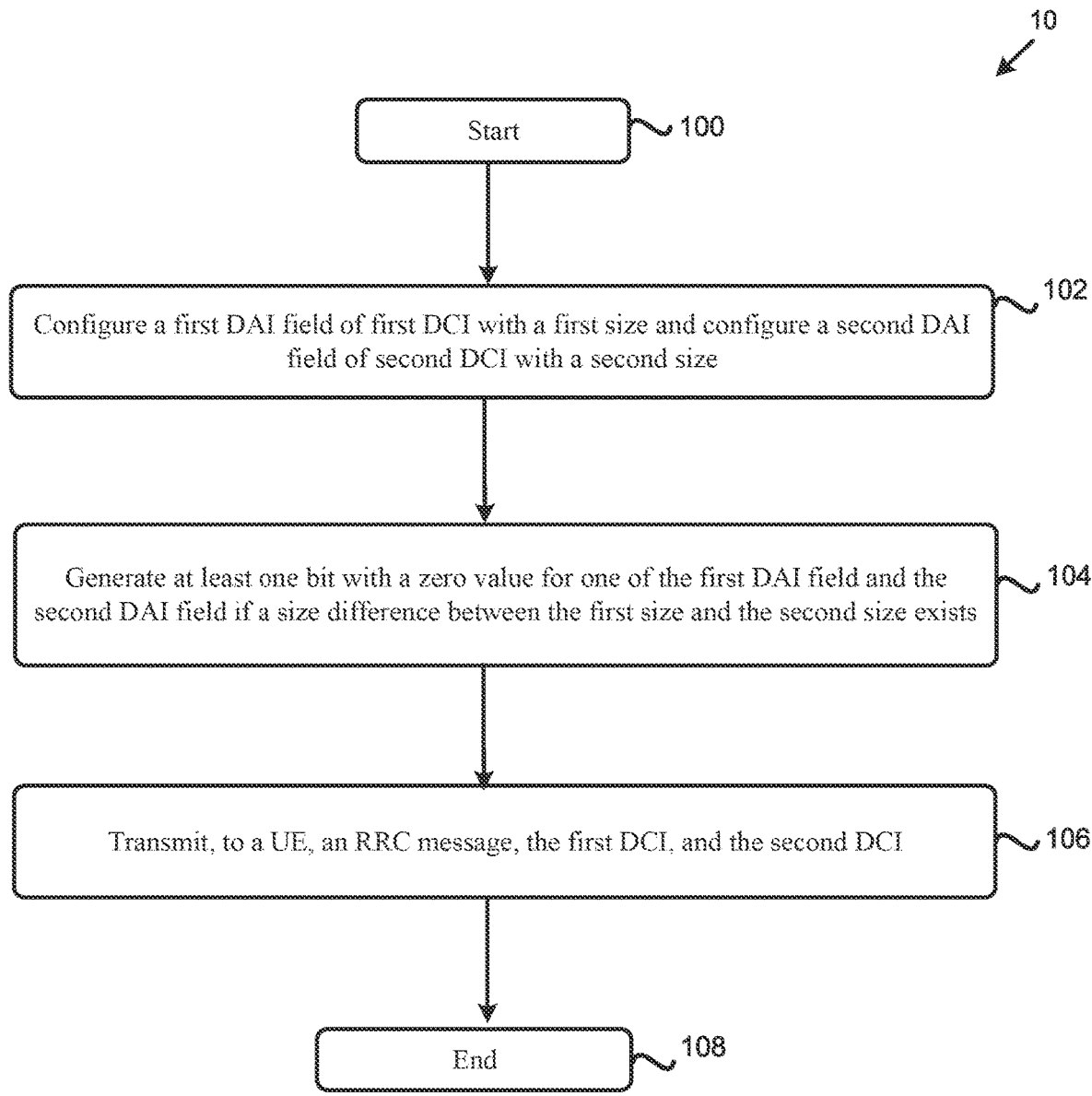
FIG. 1 is a flowchart illustrating a DCI format construction procedure performed by a BS according to an example implementation of the present disclosure.

The following contains specific information pertaining to exemplary implementations in the present disclosure. The drawings and their accompanying detailed disclosure are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

The following contains specific information pertaining to example implementations in the present disclosure. The drawings and their accompanying detailed disclosure are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" include the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-disclosed combination, group, series, and the equivalent.

The term "and/or" herein is only an association relationship for describing associated objects, and represents that three relationships may exist, for example, A and/or B may represent that A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may include computer-executable instructions stored on computer-readable media, such as memory or other types of storage devices. For example, one or more microprocessors or general-purpose computers with communication processing capability may be programmed with corresponding executable instructions and carry out the disclosed NW function(s) or algorithm(s). The microprocessors or general-purpose computers may be formed of Application-Specific Integrated Circuits (ASICs), programmable logic arrays, and/or one or more Digital Signal Processor (DSPs). Although some of the example implementations in the present disclosure are directed to software installed and executing on computer hardware, alternative example implementations implemented as firmware, as hardware, or as a combination of hardware and software are well within the scope of the present disclosure.

The computer-readable medium includes, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long-Term Evolution (LTE) system, an LTE-Advanced (LTE-A) system, or an LTE-Advanced Pro system) typically includes at least one Base Station (BS), at least one user equipment (UE), and one or more optional NW elements that provide connection towards an NW. The UE communicates with the NW (e.g., a Core NW (CN), an Evolved Packet Core (EPC) NW, an Evolved Universal Terrestrial Radio Access NW (E-UTRAN), a Next-Generation Core (NGC), or an Internet), through a Radio Access NW (RAN) established by the BS.

It should be noted that, in the present disclosure, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE (Enhanced Data rates for GSM Evolution) Radio Access NW (GERAN), a Next Generation eNB (ng-eNB) as in an E-UTRA BS in connection with the 5GC, a next-generation Node B (gNB) as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the Downlink (DL) and optionally Uplink (UL)

resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A PSCell may refer to the SpCell of an SCG. MCG refers to a group of serving cells associated with the Master Node (MN), including the SpCell and optionally one or more secondary cells (SCells). SCG refers to a group of serving cells associated with the Secondary Node (SN), including the SpCell and optionally one or more SCells.

As previously disclosed, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

Moreover, it is also considered that in a transmission time interval of a single NR frame, at least DL transmission data, a guard period, and UL transmission data should be included, where the respective portions of the DL transmission data, the guard period, and the UL transmission data should also be configurable, for example, based on the NW dynamics of NR. In addition, SL resources may also be provided in an NR frame to support ProSe services.

In order to reduce device complexity, '3+1' Downlink Control Information (DCI) size budget is defined in the Rel-15 3GPP specification. In other words, as shown in Table 1, one UE (or another similar device) at most monitors three different DCI sizes using a Cell-Radio Network Temporary Identifier (C-RNTI) and one DCI size using other RNTIs. For following the DCI size budget per serving cell of the UE, the DCI size alignment is the procedure to ensure that the limitation is satisfied. In NR Rel-16, a possible smaller DCI size and a new DCI format for scheduling Ultra-Reliability Low-Latency Communication (URLLC) data may be introduced. Specially, a bitfield width in new DCI format fields may become configurable. Also, one new DCI format for indicating the cancellation of uplink transmission may be introduced for URLLC. Also, for a power saving purpose, one new DCI format for providing an indication of power saving information used outside an active time may be introduced.

TABLE 1

|  | non-C-RNTI (size 1) | C-RNTI (size 2) | C-RNTI (size 3) | C-RNTI (size 4) |
| --- | --- | --- | --- | --- |
| DCI format 0-0 | Monitored in Common Search Space (CSS) Apply Apply initial UL Bandwidth Part (BWP) | Monitored in UE specific SS (USS) Apply configured ULBWP | | |
| DCI format 0-1 | | | Monitored in USS Apply configured UL BWP | |
| DCI format 1-0 | Monitored in CSS Apply size of Control Resource Set (CORESET) 0 or initial DL BWP | Monitored in USS Apply configured DL BWP | | |
| DCI format 1-1 | | | | Monitored in USS Apply configured DL BWP |

It has been agreed that the maximum time domain resource allocation (TDRA) table size is increased to 64 for non-slot based Physical Uplink Shared Channel (PUSCH) repetition transmission for NR URLLC. Also, it has been agreed that the number of bits for a carrier indicator in the new DCI format for DL scheduling and the new DCI format for UL scheduling can be separately configured.

Besides, it has been agreed that up to two Hybrid Automatic Repeat reQuest-ACKnowledge (HARQ-ACK) codebooks can be simultaneously generated for supporting different service types for a UE; in other words, PDSCH-HARQ-ACK-Codebook can be separately configured for a UE. To put it another way, different types of HARQ-ACK codebook may be configured in the PUCCH-Config.

The introduction of the new DCI for scheduling URLLC data (e.g., DCI format 0-2, DCI format 1-2, DCI format 2-4) may need further rules for DCI size alignment. Since most of the bitfield sizes in the new DCI format are configurable, it may lead to increased varieties of DCI sizes. Thus, an enhanced DCI size budget and the detailed DCI size alignment should be defined. It is not clear how to align a new DCI format size with a legacy DCI format, so detailed procedures should be introduced to the 3GPP specification. Furthermore, the DCI size for outside active time (e.g., DCI format 2-6 for scheduling power saving indication) also needs to be taken into consideration. In addition, rather than configuring a cell group specific HARQ-ACK codebook type, configuring a Physical Uplink Control Channel (PUCCH)-resource specific HARQ-ACK codebook type becomes possible. Also, intra-slot based PUSCH repetition transmission supports a larger size of TDRA table. Furthermore, a configurable number of bits for a carrier indicator in the new DCI format means that the carrier indicator for DL scheduling and UL scheduling can be separately configured. In other words, when the Physical Downlink Shared Channel (PDSCH)-HARQ-ACK-Codebook is separately configured for a UE, a PUSCH TDRA size is increased to 64 and a redundancy version (RV) number becomes configurable, which may lead to some impact on the DCI field (e.g., downlink assignment index (DAI), TDRA, RV). Thus, the solutions to the problem caused from the configurable DCI field need to be further clarified.

In some implementations of the present disclosure, a new DCI format used for scheduling URLLC data (but used for scheduling other service type is not precluded) may be DCI format 1-2 (for DL) and DCI format 0-2 (for UL), respectively. In some implementations of the present disclosure, a new DCI format used for notifying the resources where UE may cancel a corresponding UL transmission from the UE may be DCI format 2-4. In some implementations of the present disclosure, a new DCI format used for indicating power saving information outside the active time may be DCI format 2-6.

The enhanced DCI size budget and detailed implementations for the DCI size alignment may be as presented hereinafter with solutions A and B.

Solution A. The DCI size budget may remain the same as the value in Rel-15 (e.g., the '3+1' based on some pre-defined conditions), and the method to differentiate DCI format with the same payload size may be further clarified in the following:
- A1. The payload size of the DCI format 1-0 equals that of the DCI format 0-0; the payload size of the DCI format 1-1 equals that of the DCI format 0-1; and the payload size of the DCI format 1-2 equals that of the DCI format 0-2.
- A2. The payload size of the DCI format 1-0 equals that of the DCI format 0-0; the payload size of the DCI format 1-2 equals that of the DCI format 0-2; and the payload size of the DCI format 1-0/0-0 equals that of the DCI format 1-2/0-2.
- A3. The payload size of the DCI formats 1-0 equals that of the DCI format 0-0; the payload size of the DCI format 1-2 equals that of the DCI format 1-1; and the payload size of the DCI format 0-2 equals that of the DCI format 0-1.
- A4. Regardless of whether the DCI format 1-0/0-0 is monitored in the CSS or in the USS, the payload size of the DCI format 1-0 equals that of the DCI format 0-0 monitored in the CSS; and the payload size of the DCI format 1-2 equals that of the DCI format 0-2.

Solution B. The value of the DCI size budget may be enhanced to '4+1' or '3+2' without conditions or based on the reported UE capability or some pre-defined conditions in the following:
- B1. For the value of DCI size budget being '4+1', the payload size of the DCI format 1-0 equals that of the DCI format 0-0; and the payload size of the DCI format 1-2 equals that of the DCI format 0-2.
- B2. For the value of DCI size budget being '4+1', regardless of whether the DCI format 1-0/0-0 is monitored in the CSS or in the USS, the payload size of the DCI format 1-0 equals that of the DCI format 0-0 monitored in the CSS.
- B3. For the value of DCI size budget being '3+2', the payload size of the DCI formats configured outside the active time (e.g., the DCI format 2-6) and the payload size of the DCI formats configured inside the active time may be counted together. Accordingly, the above-mentioned procedure(s) of the DCI size alignment (e.g., the procedure for the DCI budget '3+1') may be applied while the UE monitors three different DCI sizes using the C-RNTI and two different DCI sizes using other Radio Network Temporary Identifier (RNTI), e.g., Power Saving (PS)-RNTI. More details are presented in the following:
  - B3-1. The value of DCI size budget of '3+2' or '3+1' may be utilized, which may depend on whether the DCI format 2-6 or other DCI format outside the active time may be configured or not.
  - B3-2. If there are two or more different sizes for the DCI format 2-6, one of the payload sizes of the DCI format 2-6 is to be aligned with the DCI format 2-0/2-1/2-4/1-0/0-0. It should be noted that the DCI format 1-0/0-0 may be monitored in the CSS.
  - B3-3. The payload size of the DCI format 2-1 is to be aligned with that of the DCI format 2-4 based on certain conditions.

The following presents the impacts on the DCI format field. It is because the payload size of the DCI format for initial transmission for type2 configured grant configuration or for semi-persistent scheduling may need to be the same as that of the DCI format for re-transmission (e.g. the DCI format scrambled with Configured Scheduling (CS)-RNTI and the DCI format scrambled with C-RNTI). Furthermore, some field(s) position may need to be aligned between the DCI format for initial transmission and the DCI format for re-transmission. Also, aligning the size of configurable fields between different DCI formats may decrease the varieties of DCI size.

First, if there are different types of PDSCH-HARQ-ACK-Codebook (e.g., semi-static type and/or dynamic type) configured to the UE, a size of a downlink assignment indicator (DAI) field may equal that of the DCI for scheduling data corresponding to the Type 2 HARQ-ACK codebook. Specifically, Type1 HARQ-ACK codebook is referred to as semi-static HARQ-ACK codebook and Type 2 HARQ-ACK codebook is referred to as dynamic HARQ-ACK codebook, respectively. Second, if a priority indication field is configured, the size of the field may be the same between different DCI formats and/or the same DCI formats scrambled with different RNTIs. Third, for the TDRA field and the RV field, if the Rel-16 PUSCH scheme is configured, the size of the field may align with the maximum size of the field between different DCI formats and/or the same DCI formats scrambled with different RNTIs.

More detailed disclosures/solutions/embodiments/examples/methods are presented in the following. Noticeably, any two or more than two of the following paragraphs, solutions, embodiments, methods, examples, operations, points, actions, behaviors, terms, or claims described in the following may be combined logically, reasonably, and properly to form a specific method. Any sentence, paragraph, solutions, embodiments, methods, examples, operations, point, action, behaviors, terms, or claims described in the following may be implemented independently and separately to form a specific method. Dependency, e.g., "based on", "more specifically", "preferably", "in one embodiment", or etc., in the following disclosure is just one possible example which would not restrict the specific method.

Implementations of the present disclosure include enhancing the DCI size budget. Specifically, the possible DCI size budget may need some enhancements. In one example, the DCI size budget remains the same as that of Rel-15. Preferably, the total number of different DCI sizes configured to monitor may be 4 for a cell. Specifically, the number of different DCI sizes scrambled with C-RNTI configured to monitor may be 3 and the number of DCI size scrambled with other RNTIs configured to monitor may be 1 for the cell.

In one example, the DCI size budget enhances to 5. In one aspect of this example, the total number of different DCI sizes configured to monitor may be 5 for a cell. Specifically, the number of different DCI sizes scrambled with C-RNTI configured to monitor may be 4 and the number of DCI sizes scrambled with other RNTIs configured to monitor may be 1 for the cell. In another aspect of this example, the total number of different DCI sizes configured to monitor may be 5 for a cell. Specifically, the number of different DCI sizes scrambled with C-RNTI configured to monitor may be 3 and the number of DCI sizes scrambled with other RNTIs configured to monitor may be 2 for the cell.

In some of the embodiments, the DCI size budget may be determined explicitly based on reported UE capability. In one example, the UE may report the exact supported DCI size budget, and then the UE may not expect to handle a configuration that results in the total number of different DCI sizes configured to monitor being more than this value for the cell. In another example, the UE may indicate a capability which is used for indicating whether to support different service types for the cell based on this capability, and then the UE may not expect to handle a configuration that results in the total number of different DCI sizes configured to monitor being more than a value or within a range for the cell. In another example, the UE may indicate several capabilities (e.g., the DCI budget '3+1' and '4+1') and the applied DCI budget may be up to the gNB's configuration. More specifically, if the DCI budget '3+1' is applied, the gNB may not configure such scheduling associated with the DCI budget '4+1' to the UE.

In some of the embodiments, the DCI size budget may be determined implicitly based on some conditions. In one example, the DCI size budget '3+1' may be applied as a default value for the UE when the UE is configured to a power saving mode explicitly or implicitly. More specifically, if the DCI size budget '4+1' may be applied to the UE originally, the UE may fall back to a default state (e.g., the DCI budget '3+1') after receiving some indications or configurations.

Again, in some of the embodiments, the DCI size budget may be determined implicitly based on some conditions. In another example, the DCI size budget may depend on a capability for indicating URLLC service, power saving service, or other types of service having different requirements. More details are presented in the following scenarios.

In one aspect of these examples, the DCI size budget may depend on PDCCH monitoring capability reported by the UE. The PDCCH monitoring capability may indicate whether URLLC data is scheduled or not, so the DCI size budget may be larger when some specific monitoring spans are supported (e.g., PDCCH monitoring span (2,2)). Otherwise, it may be unnecessary to increase the DCI size budget.

In one aspect of these examples, the DCI size budget may depend on whether the new DCI format (e.g., DCI format 0-2/DCI format 1-2/DCI format 2-4/DCI format 2-6) is configured on the same carrier or not.

In one aspect of these examples, the DCI size budget may depend on whether different minimum PDSCH processing time capabilities on the same carrier are supported or not.

In one aspect of these examples, the DCI size budget may depend on whether out-of-order on the same carrier is supported or not.

In one aspect of these examples, the DCI size budget may depend on whether intra-slot based PUSCH repetition transmission (e.g., the PUSCH transmission scheme in Rel-16) on the same carrier is supported or not.

In one aspect of these examples, the DCI size budget may depend on whether multiple configured grant/Semi-Persistent Scheduling (SPS) configurations on the same carrier are supported or not.

In one aspect of these examples, the DCI size budget may depend on whether cross-slot scheduling on the same carrier is supported or not.

In one aspect of these examples, the DCI size budget may depend on whether PDCCH based indication for power saving information configured outside the active time on the same carrier is supported or not.

In one aspect of these examples, the DCI size budget may depend on whether the scheduled data or the DCI is configured in the specific BWP or in a default BWP to the UE.

In one aspect of these examples, the DCI size budget may depend on whether the UE is configured to a long Discontinuous Reception (DRX) state.

Implementations of the present disclosure include enhancing the DCI size alignment. Specifically, the DCI budget is equal to the DCI budget '3+1'. If necessary, padding or truncation may be applied to the DCI formats, and more details are presented in the following embodiments.

In one example, if the DCI budget '3+1' is applied, the payload size of the DCI format 1-0 equals that of the DCI format 0-0; the payload size of the DCI formats 1-1 equals that of the DCI format 0-1; and the payload size of the DCI format 1-2 equals that of the DCI format 0-2. Example implementations are presented in Table 2.

TABLE 2

|  | non-C-RNTI (size 1) or C-RNTI | C-RNTI (size 2) | C-RNTI (size 3) | C-RNTI (size 4) |
| --- | --- | --- | --- | --- |
| DCI format 0-0 | Monitored in CSS Apply initial UL BWP | Monitored in USS Apply configured UL BWP | | |
| DCI format 0-1 | | | Monitored in USS Apply configured UL BWP | |
| DCI format 0-2 | | | | Monitored in USS Apply configured UL BWP |
| DCI format 1-0 | Monitored in CSS Apply size of CORESET 0 or initial DL BWP | Monitored in USS Apply configured DL BWP | | |
| DCI format 1-1 | | | Monitored in USS Apply configured DL BWP | |
| DCI format 1-2 | | | | Monitored in USS Apply configured DL BWP |

In one example, if the DCI budget '3+1' is applied, the payload size of the DCI format 1-0 equals that of the DCI format 0-0; the payload size of the DCI format 1-2 equals that of the DCI format 0-2; and the payload size of the DCI format 1-0/0-0 equals that of the DCI format 1-2/0-2. Example implementations are presented in Table 3.

TABLE 3

| | non-C-RNTI (size 1) or C-RNTI | C-RNTI (size 2) | C-RNTI (size 3) | C-RNTI (size 4) |
|---|---|---|---|---|
| DCI format 0-0 | Monitored in CSS Apply initial UL BWP | Monitored in USS Apply configured UL BWP | | |
| DCI format 0-1 | | | Monitored in USS Apply configured UL BWP | |
| DCI format 0-2 | | Monitored in USS Apply configured UL BWP | | |
| DCI format 1-0 | Monitored in CSS Apply size of CORESET 0 or initial DL BWP | Monitored in USS Apply configured DL BWP | | |
| DCI format 1-1 | | | | Monitored in USS Apply configured DL BWP |
| DCI format 1-2 | | Monitored in USS Apply configured DL BWP | | |

As can be seen in Table 3, in one aspect of this example, the payload size of the DCI format 1-0/0-0 may be the same as that of DCI format 1-2/0-2, and both may be scrambled with C-RNTI, and accordingly, it may need more clarification on how to differentiate DCI formats with the same size. A new field in DCI format (e.g., an identifier) may be used. For example, '0' may refer to DCI format 1-0/0-0; and '1' may refer to DCI format 1-2/0-2. In another example, '0' may refer to DCI format 1-2/0-2; and '1' may refer to DCI format 1-0/0-0.

In another aspect of this example, it may use a new field that is used to indicate the priority in the DCI format. For example, '0' may refer to DCI format 1-0/0-0; and '1' may refer to DCI format 1-2/0-2. In another example, '0' may refer to DCI format 1-2/0-2; and '1' may refer to DCI format 1-0/0-0.

In one aspect of this example, it may use a new RNTI or Modulation Coding Scheme-Cell (MCS-C)-RNTI that is used to differentiate the priority for the DCI format. For example, if payload size of the DCI format 1-0/0-0 is the same as that of the DCI format 1-2/0-2, one of the DCI formats may be scrambled with new-RNTI or MCS-C-RNTI, and the DCI format scrambled with new-RNTI or MCS-C-RNTI may refer to DCI format 1-2/0-2. in another example, the DCI format scrambled with new-RNTI or MCS-C-RNTI may refer to DCI format 1-0/0-0.

In one aspect of this example, the CORESET or search space may be utilized. For example, DCI format 1-0/0-0 may be monitored in different CORESETs/search spaces from DCI format 1-2/0-2. Another example may be that a specific CORESET ID or search space ID may refer to different DCI formats. Moreover, the DCI format 1-2/0-2 may be configured to the smaller CORESET ID/search space ID, and vice versa.

In one embodiment, if the DCI budget '3+1' is applied, the payload size of the DCI format 1-0 equals that of the DCI format 0-0; the payload size of the DCI formats 1-2 equals that of the DCI format 1-1; and the payload size of the DCI formats 0-2 equals that of the DCI format 0-1. Detailed implementations are presented in Table 4.

TABLE 4

| | non-C-RNTI (size 1) or C-RNTI | C-RNTI (size 2) | C-RNTI (size 3) | C-RNTI (size 4) |
|---|---|---|---|---|
| DCI format 0-0 | Monitored in CSS Apply initial UL BWP | Monitored in USS Apply configured UL BWP | | |
| DCI format 0-1 | | | Monitored in USS Apply configured UL BWP | |
| DCI format 0-2 | | | Monitored in USS Apply configured UL BWP | |
| DCI format 1-0 | Monitored in CSS Apply size of CORESET 0 or initial DL BWP | Monitored in USS Apply configured DL BWP | | |
| DCI format 1-1 | | | | Monitored in USS Apply configured DL BWP |
| DCI format 1-2 | | | | Monitored in USS Apply configured DL BWP |

As can be seen in Table 4, in one aspect of this example, the payload size of the DCI format 1-1 may be the same as that of DCI format 1-2, and the payload size of the DCI format 0-1 may be the same as that of DCI format 0-2, respectively, and accordingly, it may need more clarification on how to differentiate DCI formats with the same size. A new field in DCI format (e.g., an identifier) may be used. For example, '0' may refer to DCI format 1-1/0-1; and '1' may refer to DCI format 1-2/0-2, and vice versa.

In one aspect of this example, it may use a new field that is used to indicate the priority in the DCI format. For example, '0' may refer to DCI format 1-1/0-1; and '1' may refer to DCI format 1-2/0-2, and vice versa.

In one aspect of this example, it may use a new-RNTI or MCS-C-RNTI that is used to differentiate the priority for the DCI format. For example, if the payload size of the DCI format 1-1/0-1 is the same as that of the DCI format 1-2/0-2, one of the DCI formats may be scrambled with new-RNTI or MCS-C-RNTI, and the DCI format scrambled with new-RNTI or MCS-C-RNTI may refer to DCI format 1-2/0-2, and vice versa.

In one aspect of this example, it may use the CORESET or search space. For example, DCI format 1-1/0-1 may be monitored in different CORESETs/search spaces from the DCI format 1-2/0-2. Another example may be that a specific CORESET ID or search space ID may refer to a different DCI format. Moreover, the DCI format 1-2/0-2 may be configured to the smaller CORESET ID/search space ID, and vice versa.

In one embodiment, if the DCI budget '3+1' is applied, regardless of whether the DCI format 1-0/0-0 is monitored in the CSS or in the USS, the payload size of the DCI format 1-0 equals that of the DCI format 0-0 monitored in the CSS. In other words, it is disclosed to align the payload size of DCI format 1-0/0-0 monitored in the CSS and that of DCI format 1-0/0-0 monitored in the USS, and the payload size of DCI format 1-0/0-0 monitored in the USS is given based on an initial BWP or the size of CORESET 0. In addition, the payload size of the DCI format 1-2 equals that of the DCI format 0-2. Example implementations are presented in Table 5.

TABLE 5

|  | non-C-RNTI (size 1) or C-RNTI | C-RNTI (size 2) | C-RNTI (size 3) | C-RNTI (size 4) |
|---|---|---|---|---|
| DCI format 0-0 | Monitored in CSS or USS (C-RNTI) Apply initial UL BWP | | | |
| DCI format 0-1 | | | Monitored in USS Apply configured UL BWP | |
| DCI format 0-2 | | Monitored in USS Apply configured UL BWP | | |
| DCI format 1-0 | Monitored in CSS or USS (C-RNTI) Apply size of CORESET 0 or initial DL BWP | | | |
| DCI format 1-1 | | | | Monitored in USS Apply configured DL BWP |
| DCI format 1-2 | | Monitored in USS Apply configured DL BWP | | |

Implementations of the present disclosure includes performing a DCI size alignment procedure for the DCI budget being equal to '3+1'. In one example, the DCI size alignment procedure may be applied according to the following six actions (e.g., Action 0 through Action 5 as presented below). Noticeably, in one embodiment, each action in the procedure may be arbitrarily combined or exchanged. Also, in one embodiment, the DCI size alignment for the DCI format 1-2 and the DCI format 0-2 may be proceeded before or after the UE performs the DCI size alignment for the DCI format 0-0 and the DCI format 1-0, and/or for the DCI format 0-1 and the DCI format 1-1.

In one embodiment, the following actions may be an example to perform a DCI size alignment procedure for Table 2.

Action 0:

It may be disclosed to determine the DCI format 0-0 monitored in the CSS based on the given configuration (e.g., SearchSpace-Config, PDCCH-Config) and/or RNTI, and the DCI format size may be related to the initial UL BWP.

It may be disclosed to determine the DCI format 1-0 monitored in the CSS based on the given configuration (e.g., SearchSpace-Config, PDCCH-Config) and/or RNTI, and the DCI format size may be related to (1) the size of the CORESET 0 if the CORESET 0 is configured for the cell; and (2) the size of an initial DL bandwidth part if the CORESET 0 is not configured for the cell.

If the DCI format 0-0 is monitored in the CSS and if the number of information bits in the DCI format 0-0 prior to padding is less than the payload size of the DCI format 1-0 monitored in the CSS for scheduling the same serving cell, a number of zero padding bits may be generated for the DCI format 0-0 until the payload size equals that of the DCI format 1-0.

If the DCI format 0-0 is monitored in the CSS and if the number of information bits in the DCI format 0-0 prior to truncation is larger than the payload size of the DCI format 1-0 monitored in the CSS for scheduling the same serving cell, the bit-width of the frequency domain resource assignment field in the DCI format 0-0 may be reduced by truncating the first few most significant bits such that the size of DCI format 0-0 equals the size of the DCI format 1-0.

Action 1:

It may be disclosed to determine the DCI format 0-0 monitored in the USS based on the given configuration (e.g., SearchSpace-Config, PDCCH-Config) and/or RNTI, and the DCI format size may be related to the size of the active UL BWP.

It may be disclosed to determine the DCI format 1-0 monitored in the USS based on the given configuration (e.g., SearchSpace-Config, PDCCH-Config) and/or RNTI, and the DCI format size may be related to the size of the active DL BWP.

For the UE configured with supplementary Uplink in ServingCellConfig in a cell, if the PUSCH is configured to be transmitted on both the supplementary UL (SUL) and the non-SUL of the cell and if the number of information bits in the DCI format 0-0 in the USS for the SUL is not equal to the number of information bits in the DCI format 0-0 in the USS for the non-SUL, a number of zero padding bits may be generated for the smaller DCI format 0-0 until the payload size equals that of the larger DCI format 0-0.

If the DCI format 0-0 is monitored in the USS and if the number of information bits in the DCI format 0-0 prior to padding is less than the payload size of the DCI format 1-0 monitored in the USS for scheduling the same serving cell, a number of zero padding bits may be generated for the DCI format 0-0 until the payload size equals that of the DCI format 1-0.

If the DCI format 1-0 is monitored in the USS and if the number of information bits in the DCI format 1-0 prior to padding is less than the payload size of the DCI format 0-0 monitored in the USS for scheduling the same serving cell, zeros may be appended to the DCI format 1-0 until the payload size equals that of the DCI format 0-0.

Action 2:

It may be disclosed to determine the DCI format 0-1 monitored in the USS based on the given configuration (e.g., SearchSpace-Config, PDCCH-Config) and/or RNTI, and the DCI format size may be related to the size of the active UL BWP.

It may be disclosed to determine the DCI format 1-1 monitored in the USS based on the given configuration (e.g., SearchSpace-Config, PDCCH-Config) and/or RNTI, and the DCI format size may be related to the size of the active DL BWP.

For the UE configured with supplementary Uplink in ServingCellConfig in a cell, if the PUSCH is configured to be transmitted on both the SUL and the non-SUL of the cell and if the number of information bits in the DCI format 0-1 for the SUL is not equal to the number of information bits in the DCI format 0-1 for the non-SUL, zeros may be appended to the smaller DCI format 0-1 until the payload size equals that of the larger DCI format 0-1.

If the size of the DCI format 0-1 monitored in the USS equals that of the DCI format 0-0/1-0 monitored in another USS, one bit of zero padding may be appended to the DCI format 0-1.

If the size of the DCI format 1-1 monitored in the USS equals that of the DCI format 0-0/1-0 monitored in another USS, one bit of zero padding may be appended to the DCI format 1-1.

Action 3:

It may be disclosed to determine the DCI format 0-2 monitored in the USS based on the given configuration (e.g., SearchSpace-Config, PDCCH-Config) and/or RNTI, and the DCI format size may be related to the size of the active UL BWP.

It may be disclosed to determine the DCI format 1-2 monitored in the USS based on the given configuration (e.g., SearchSpace-Config, PDCCH-Config) and/or RNTI, and the DCI format size may be related to the size of the active DL BWP.

For the UE configured with supplementary Uplink in ServingCellConfig in a cell, if the PUSCH is configured to be transmitted on both the SUL and the non-SUL of the cell and if the number of information bits in the DCI format 0-2 for the SUL is not equal to the number of information bits in DCI format 0-2 for the non-SUL, bits with value set to zero may be appended to the smaller DCI format 0-2 until the payload size equals that of the larger DCI format 0-2.

If the DCI format 0-2 is monitored in USS and if the number of information bits in the DCI format 0-2 prior to padding is less than the payload size of the DCI format 1-2 monitored in the USS for scheduling the same serving cell, a number of zero padding bits may be generated for the DCI format 0-2 until the payload size equals that of the DCI format 1-2.

If the DCI format 1-2 is monitored in the USS and if the number of information bits in the DCI format 1-2 prior to padding is less than the payload size of the DCI format 0-2 monitored in the USS for scheduling the same serving cell, a number of zero padding bits may be appended to the DCI format 1-2 until the payload size equals that of the DCI format 0-2.

Action 4:

The size alignment procedure may be completed if both of the following conditions are fulfilled: (1) the total number of different DCI sizes configured to monitor may be no more than 4 for the cell; and (2) the total number of different DCI sizes scrambled with C-RNTI configured to monitor may be no more than 3 for the cell.

Otherwise, it may be disclosed to perform the following operations.

It may be disclosed to remove the padding bit (if any) introduced in Action 2 above.

It may be disclosed to determine the DCI format 1-0 monitored in the USS based on the given configuration (e.g., SearchSpace-Config, PDCCH-Config) and/or RNTI, and the DCI format size may be related to the size of the active DL BWP, where active DL BWP is given by: (1) the size of the CORESET 0 if the CORESET 0 is configured for the cell; and (2) the size of the initial DL BWP if the CORESET 0 is not configured for the cell.

It may be disclosed to determine the DCI format 0-0 monitored in the USS based on the given configuration (e.g., SearchSpace-Config, PDCCH-Config) and/or RNTI, and the DCI format size may be related to the size of the initial UL BWP.

If the number of information bits in the DCI format 0-0 monitored in the USS prior to padding is less than the payload size of the DCI format 1-0 monitored in the USS for scheduling the same serving cell, a number of zero padding bits may be generated for the DCI format 0-0 monitored in the USS until the payload size equals that of the DCI format 1-0 monitored in the USS.

If the number of information bits in the DCI format 0-0 monitored in the USS prior to truncation is larger than the payload size of the DCI format 1-0 monitored in the USS for scheduling the same serving cell, the bit-width of the frequency domain resource assignment field in the DCI format 0-0 may be reduced by truncating the first few most significant bits such that the size of the DCI format 0-0 monitored in the USS equals the size of the DCI format 1-0 monitored in the USS.

In some of the embodiments, the UE may be not expected to handle a configuration that, after applying the above actions, results in either one of the scenarios: (1) the total number of different DCI sizes configured to monitor may be more than 4 for the cell; (2) the total number of different DCI sizes scrambled with C-RNTI configured to monitor may be more than 3 for the cell; (3) the size of the DCI format 0-0 in one USS may be equal to that of DCI format 0-1 in the same or another USS; (4) the size of the DCI format 0-2 in one USS may be equal to that of DCI format 0-1 in the same or another USS; (5) the size of the DCI format 1-0 in one USS may be equal to that of DCI format 1-1 in the same or another USS; or (6) the size of DCI format 1-2 in one USS may be equal to that of DCI format 1-1 in the same or another USS.

In some of the embodiments, the DCI budget is equal to '4+1'. In one example, if the DCI budget '4+1' is applied, the payload size of the DCI format 1-0 equals that of the DCI format 0-0; and the payload size of the DCI format 1-2 equals that of the DCI format 0-2. Detailed implementations are presented in Table 6.

TABLE 6

| | non-C-RNTI (size 1) or C-RNTI | C-RNTI (size 2) | C-RNTI (size 3) | C-RNTI (size 4) | C-RNTI (size 5) |
|---|---|---|---|---|---|
| DCI format 0-0 | Monitored in CSS or USS Apply initial UL BWP | Monitored in USS Apply configured UL BWP | | | |
| DCI format 0-1 | | | Monitored in USS Apply configured UL BWP | | |
| DCI format 0-2 | | | | | Monitored in USS Apply configured UL BWP |
| DCI | Monitored | Monitored | | | |

TABLE 6-continued

| | non-C-RNTI (size 1) or C-RNTI | C-RNTI (size 2) | C-RNTI (size 3) | C-RNTI (size 4) | C-RNTI (size 5) |
|---|---|---|---|---|---|
| DCI format 1-0 | in CSS Apply size of CORESET 0 or initial DL BWP | in USS Apply configured UL BWP | | | |
| DCI format 1-1 | | | | Monitored in USS Apply configured DL BWP | |
| DCI format 1-2 | | | | | Monitored in USS Apply configured DL BWP |

Also, in one example, if the DCI budget '4+1' is applied, regardless of whether DCI format 1-0/0-0 is monitored in the CSS or in the USS, the payload size of the DCI format 1-0 may equal that of the DCI format 0-0 monitored in the CSS. In other words, it may be disclosed to determine the DCI format 1-0/0-0 monitored in the USS where the BWP is given by the initial BWP or the size of CORESET 0. Example implementations are presented in Table 7.

TABLE 7

| | non-C-RNTI (size 1) or C-RNTI | C-RNTI (size 2) | C-RNTI (size 3) | C-RNTI (size 4) | C-RNTI (size 5) |
|---|---|---|---|---|---|
| DCI format 0-0 | Monitored in CSS or USS (C-RNTI) Apply initial UL BWP | | | | |
| DCI format 0-1 | | Monitored in USS Apply configured UL BWP | | | |
| DCI format 0-2 | | | Monitored in USS Apply configured UL BWP | | |
| DCI format 1-0 | Monitored in CSS or USS (C-RNTI) Apply size of CORESET 0 or initial DL BWP | | | | |
| DCI format 1-1 | | | | Monitored in USS Apply configured DL BWP | |
| DCI format 1-2 | | | | | Monitored in USS Apply configured DL BWP |

In some of the embodiments, the DCI size budget may be equal to '3+2'. In one example, there may be DCI formats configured outside the active time (e.g., the DCI format 2-6) then the DCI budget '3+2' may be applied. The DCI size alignment procedure for a DCI format scrambled by C-RNTI may refer to the procedure mentioned in the above paragraph, which is omitted hereinafter for brevity.

In one aspect of this example, the payload size of the DCI format outside the active time may equal that of the DCI format scrambled by non-C-RNTI inside the active time. For example, if there are more than two different DCI format sizes outside the active time, the DCI format 2-6 scrambled with PS-RNTI may have the same payload size as the DCI format 2-0 scrambled with Slot Format Indication (SFI)-RNTI, the DCI format 2-1 scrambled with Interruption (INT)-RNTI, the DCI format 2-4 scrambled with Cancellation Indication (CI)-RNTI, the DCI format 1-0 scrambled with non-C-RNTI, or the DCI format 0-0 scrambled with non-C-RNTI. Alternatively, the DCI format 2-1 scrambled with INT-RNTI and the DCI format 2-4 scrambled with CI-RNTI may have the same payload size.

In some of the embodiments, it may be disclosed to consider the impact from the configurable bit-field. First, it may be disclosed to consider the DAI corresponding to a DAI field, which may include a counter DAI (cDAI) field and/or a total DAI (tDAI) field. Furthermore, a value of the cDAI field in DCI formats denotes the accumulative number of {serving cell, PDCCH monitoring occasion}-pair(s) in which PDSCH reception(s) or SPS PDSCH release associated with the DCI formats is present up to the current serving cell and current PDCCH monitoring occasion. A value of the tDAI field, when present, in a DCI format denotes the total number of {serving cell, PDCCH monitoring occasion}-pair(s) in which PDSCH reception(s) or SPS PDSCH release associated with DCI formats is present, up to the current PDCCH monitoring occasion m and is updated from PDCCH monitoring occasion to PDCCH monitoring occasion. Besides, a UE may assume a same value of tDAI in all DCI formats that include a tDAI field in PDCCH monitoring occasion m. A UE does not expect to multiplex, in a same Type-2 HARQ-ACK codebook, HARQ-ACK information that is in response to detection of DCI formats with different number of bits for the cDAI field.

In one example illustrating a wireless communication system that includes at least one BS and one UE, the UE may receive, from the BS, a radio resource control (RRC) message including information for configuring a HARQ-ACK codebook list, a first DCI, and a second DCI, where the HARQ-ACK codebook list includes a first HARQ-ACK codebook indicated by the first DCI and a second HARQ-ACK codebook indicated by the second DCI. Noticeably, a first priority of the first HARQ-ACK codebook and a second priority of the second HARQ-ACK codebook are different, and the first DCI and the second DCI have a same format. In another example, the UE may determine whether a size difference exists between a first DAI field of the first DCI and a second DAI field of the second DCI. In another example, the UE may insert at least one bit with a zero value into one of the first DAI field and the second DAI field when the size difference between the first DAI field of the first DCI and the second DAI field of the second DCI is determined, where the inserted at least one bit with the zero value forms a most significant bit in the first DAI field or in the second DAI field. Preferably, the first HARQ-ACK codebook and the second HARQ-ACK codebook have different types, where the types refer to a semi-static type and a dynamic type, respectively. Specifically, if different types of PDSCH- HARQ-ACK-Codebook are configured to the UE, the size of the DAI field may be equal to the bit-width of the DAI field in the DCI for scheduling data corresponding to a Type2 HARQ-ACK codebook. For example, if the UE is configured with PDSCH-HARQ-ACK-Codebook=semi-static and PDSCH-HARQ-ACK-Codebook=dynamic in the PUCCH-Config, the number of bits for the DAI field in the DCI format for scheduling the PDSCH with semi-static HARQ-ACK codebook may be zero and the number of bits for the DAI field in the DCI format for scheduling the PDSCH with dynamic HARQ-ACK codebook may be two or four.

Specifically, in one aspect of this example, '00' or '0000' may be configured to the DAI field in the DCI formats for scheduling the PDSCH with a semi-static HARQ-ACK codebook. In other words, the UE may insert a number of bits, where each bit is set with the zero value, to the DAI field in the corresponding DCI that has the smaller bit size. In another aspect of this example, '11' or '1111' may be configured to the DAI field in the DCI formats for scheduling the PDSCH with a semi-static HARQ-ACK codebook.

FIG. 1 is a flowchart illustrating a DCI format construction procedure 10 performed by a BS according to an example implementation of the present disclosure. As illustrated in FIG. 1, the DCI format construction procedure 10 for the BS includes:

Action 100: Start.
Action 102: Configure a first DAI field of first DCI with a first size and configure a second DAI field of second DCI with a second size.
Action 104: Generate at least one bit with a zero value for one of the first DAI field and the second DAI field if a size difference between the first size and the second size exists.
Action 106: Transmit, to a UE, an RRC message, the first DCI, and the second DCI.
Action 108: End.

Preferably, action 102 to action 106 of the DCI format construction procedure 10 may be applied to the UE and the BS. Since detailed operations of the action 102 to action 106 have been comprehensively discussed and/or introduced above, details of the related operations are omitted for brevity.

Second, implementations of the present disclosure are to consider the priority indication field. In one example, if the priority indication field is configured in the DCI format for dynamic grant but the priority indication field is not configured in the DCI format for configured grant, the size of the field may need to be the same to avoid ambiguity between (de)activation DCI and re-transmission DCI.

Specifically, in one aspect of this example, the bit-width of the priority indication field between the (de)activation DCI and the re-transmission DCI may be the same. For example, there may be 1 bit-width in the DCI for dynamic grant, and '0' may be padded for this field in the DCI for configured grant. Alternatively, in another aspect of this example, if the UE detects inconsistent information for priority indication between different DCI formats or the same DCI formats scrambled with different RNTI, the UE may discard the priority information in the DCI formats.

Third, implementations of the present disclosure are to consider the TDRA field. In one example, if the Rel-16 PUSCH scheme is configured, the size of the TDRA field may be the minimum configured bit-width between different DCI formats or the same DCI formats scrambled with different RNTIs.

Fourth, implementations of the present disclosure are to consider the RV field. In one example, the size of the RV field may be the maximum configured bit-width between different DCI formats or the same DCI formats scrambled with different RNTIs.

Figure 2:
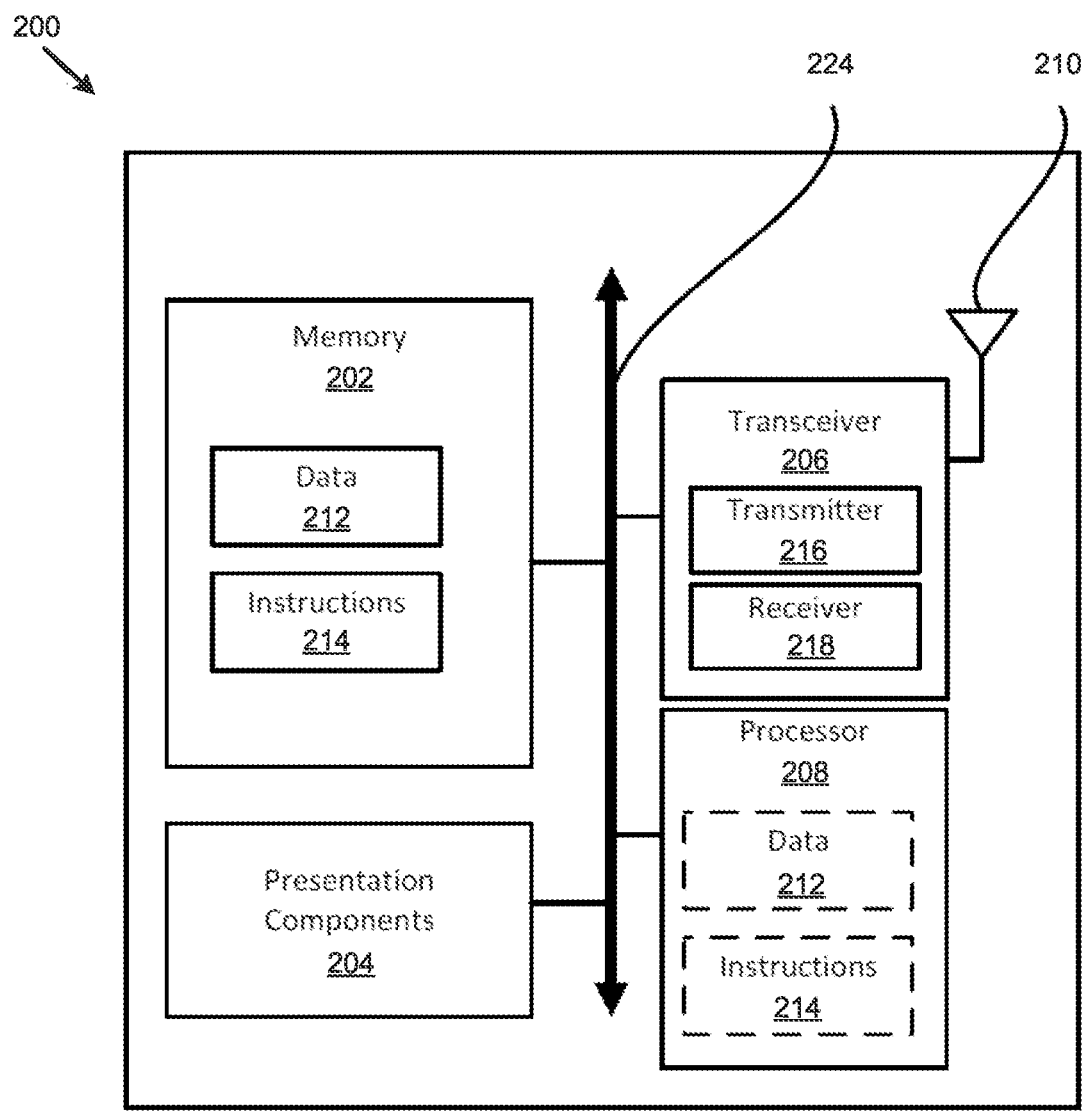
FIG. 2 is a block diagram illustrating a node for wireless communication according to an example implementation the present disclosure.

FIG. 2 illustrates a block diagram of a node 200 for wireless communication according to an example implementation the present disclosure. As illustrated in FIG. 2, the node 200 may include a transceiver 206, a processor 208, a memory 202, one or more presentation components 204, and at least one antenna 210. The node 200 may also include a Radio Frequency (RF) spectrum band module, a BS communications module, an NW communications module, and a system communications management module, input/output (I/O) ports, I/O components, and power supply (not explicitly illustrated in FIG. 2). Each of these components may be in communication with each other, directly or indirectly, over one or more buses 224. In one implementation, the node 200 may be a UE or a BS that performs various functions disclosed herein, for example, with reference to FIG. 1.

The transceiver 206 having a transmitter 216 (e.g., transmitting/transmission circuitry) and a receiver 218 (e.g., receiving/reception circuitry) may be configured to transmit and/or receive time and/or frequency resource partitioning information. In one implementation, the transceiver 206 may be configured to transmit in different types of subframes and slots, including, but not limited to, usable, non-usable, and flexibly usable subframes and slot formats. The transceiver 206 may be configured to receive data and control channels.

The node 200 may include a variety of computer-readable media. Computer-readable media may be any available media that may be accessed by the node 200 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information, such as computer-readable information.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal, such as a carrier wave or other transport mechanism, and include any information delivery media. The term "modulated data signal" may mean a signal that has one or more of its characteristics set or changed in such a manner as to encode information in the signal. By way of example, and not limitation, communication media may include wired media, such as a wired NW or direct-wired connection, and wireless media, such as acoustic, RF, infrared, and other wireless media. Combinations of any of the previous disclosure should also be included within the scope of computer-readable media.

The memory 202 may include computer-storage media in the form of volatile and/or non-volatile memory. The memory 202 may be removable, non-removable, or a combination thereof. For example, the memory 202 may include solid-state memory, hard drives, optical-disc drives, etc. As illustrated in FIG. 2, the memory 202 may store computer-readable and/or -executable instructions 214 (e.g., software codes) that are configured to, when executed, cause the processor 208 to perform various functions disclosed herein, for example, with reference to FIG. 1. Alternatively, the instructions 214 may not be directly executable by the processor 208 but may be configured to cause the node 200 (e.g., when compiled and executed) to perform various functions disclosed herein.

The processor 208 (e.g., having processing circuitry) may include an intelligent hardware device, a Central Processing Unit (CPU), a microcontroller, an ASIC, etc. The processor 208 may include memory. The processor 208 may process the data 212 and the instructions 214 received from the memory 202, and information through the transceiver 206, the baseband communications module, and/or the NW communications module. The processor 208 may also process information to be sent to the transceiver 206 for transmission through the antenna 210, to the NW communications module for transmission to a CN.

One or more presentation components 204 may present data indications to a person or other device. Examples of presentation components 204 may include a display device, speaker, printing component, vibrating component, etc.

From the previous disclosure, it is manifested that various techniques may be used for implementing the concepts described in the present disclosure without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Still, many rearrangements, modifications, and substitutions are possible without departing from the scope of the present disclosure.

What is claimed is:

1. A method performed by a Base Station (BS) for construction of a downlink control information (DCI) format, the method comprising:
   configuring a first downlink assignment index (DAI) field of first DCI with a first size and configuring a second DAI field of second DCI with a second size;
   generating at least one bit with a zero value for one of the first DAI field and the second DAI field if a size difference between the first size and the second size exists; and
   transmitting, to a User Equipment (UE), a radio resource control (RRC) message, the first DCI, and the second DCI, wherein:
   the RRC message comprises information for configuring a Hybrid Automatic Repeat reQuest-ACKnowledge (HARQ-ACK) codebook list,
   the HARQ-ACK codebook list comprises a first HARQ-ACK codebook indicated by the first DCI and a second HARQ-ACK codebook indicated by the second DCI, and
   the first DCI and the second DCI have a same format.

2. The method of claim 1, wherein the generated at least one bit with the zero value forms a most significant bit for the one of the first DAI field and the second DAI field.

3. The method of claim 1, wherein a first priority of the first HARQ-ACK codebook and a second priority of the second HARQ-ACK codebook are different.

4. The method of claim 1, wherein:
   the first HARQ-ACK codebook and the second HARQ-ACK codebook have different types, and
   the different types comprise a semi-static type and a dynamic type.

5. A Base Station (BS) in a wireless communication system for construction of a downlink control information (DCI) format, the wireless communication system also comprising a User Equipment (UE), the BS comprising:
   at least one processor; and
   at least one memory coupled to the at least one processor, wherein the at least one memory stores computer-executable instructions that, when executed by the at least one processor, cause the BS to:
   configure a first downlink assignment index (DAI) field of first DCI with a first size and configure a second DAI field of second DCI with a second size;
   generate at least one bit with a zero value for one of the first DAI field and the second DAI field if a size difference between the first size and the second size exists; and
   transmit, to the UE, a radio resource control (RRC) message, the first DCI, and the second DCI, wherein:
   the RRC message comprises information for configuring a Hybrid Automatic Repeat reQuest-ACKnowledge (HARQ-ACK) codebook list,
   the HARQ-ACK codebook list comprises a first HARQ-ACK codebook indicated by the first DCI and a second HARQ-ACK codebook indicated by the second DCI, and
   the first DCI and the second DCI have a same format.

6. The BS of claim 5, wherein the generated at least one bit with the zero value forms a most significant bit for the one of the first DAI field and the second DAI field.

7. The BS of claim 5, wherein a first priority of the first HARQ-ACK codebook and a second priority of the second HARQ-ACK codebook are different.

8. The BS of claim 5, wherein:
   the first HARQ-ACK codebook and the second HARQ-ACK codebook have different types, and
   the different types comprise a semi-static type and a dynamic type.

* * * * *